(12) United States Patent
Moon et al.

(10) Patent No.: US 12,184,755 B2
(45) Date of Patent: Dec. 31, 2024

(54) HOMOMORPHIC ENCRYPTION SYSTEM FOR SUPPORTING APPROXIMATE ARITHMETIC OPERATION AND METHOD OF OPERATING THE SAME

(71) Applicant: Samsung Electronics Co., Ltd., Suwon-si (KR)

(72) Inventors: Youngsik Moon, Suwon-si (KR); Jiyoup Kim, Hwaseong-si (KR); Hanbyeul Na, Yongin-si (KR); Hongrak Son, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 197 days.

(21) Appl. No.: 17/739,512

(22) Filed: May 9, 2022

(65) Prior Publication Data
US 2023/0146149 A1    May 11, 2023

(30) Foreign Application Priority Data

Nov. 11, 2021  (KR) .................. 10-2021-0154763
Jan. 20, 2022  (KR) .................. 10-2022-0008489

(51) Int. Cl.
| | |
|---|---|
| *H04L 9/00* | (2022.01) |
| *G06F 21/60* | (2013.01) |
| *H04L 9/06* | (2006.01) |
| *H04L 9/30* | (2006.01) |

(52) U.S. Cl.
CPC ............ *H04L 9/008* (2013.01); *H04L 9/0618* (2013.01)

(58) Field of Classification Search
CPC ...... H04L 9/008; H04L 9/0618; H04L 9/3073; G06F 21/602
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |

(Continued)

FOREIGN PATENT DOCUMENTS

| | | |
|---|---|---|
| JP | 6033741 B2 | 11/2016 |
| KR | 2021-0116299 A | 9/2021 |

(Continued)

OTHER PUBLICATIONS

Jung Hee Cheon, et al. "Efficient Homomorphic Comparison Methods with Optimal Complexity", Part of the Lecture Notes in Computer Science book series (LNCS, vol. 12492).

(Continued)

*Primary Examiner* — Vu V Tran
(74) *Attorney, Agent, or Firm* — Harness, Dickey & Pierce, P.L.C.

(57) ABSTRACT

A homomorphic encryption system includes a homomorphic encryption device encrypting original data into a first ciphertext using a homomorphic encryption algorithm, and a homomorphic encryption operation device receiving the first ciphertext from the homomorphic encryption device and performing an approximate arithmetic operation of a transcendental function with respect to the first ciphertext and a second ciphertext by performing a homomorphic multiplication operation in a binary tree structure.

20 Claims, 8 Drawing Sheets

(56) References Cited

U.S. PATENT DOCUMENTS

| | | | |
|---|---|---|---|
| 8,654,587 B2 | 2/2014 | Yoon et al. | |
| 9,536,970 B2 | 1/2017 | Seol et al. | |
| 9,900,147 B2 | 2/2018 | Laine et al. | |
| 10,211,975 B2 | 2/2019 | Loftus et al. | |
| 10,333,696 B2 | 6/2019 | Ahmed | |
| 10,382,194 B1* | 8/2019 | Miller | H04L 9/008 |
| 2013/0216044 A1* | 8/2013 | Gentry | H04L 9/008 380/277 |
| 2014/0229734 A1 | 8/2014 | Yamanaka et al. | |
| 2015/0312031 A1 | 10/2015 | Seo et al. | |
| 2017/0149557 A1* | 5/2017 | Bacon | H04L 9/3093 |
| 2017/0180115 A1* | 6/2017 | Laine | H04L 9/0618 |
| 2019/0190713 A1 | 6/2019 | Hirano et al. | |
| 2020/0110546 A1* | 4/2020 | Natanzon | G06F 11/1448 |
| 2021/0075588 A1 | 3/2021 | Khedr et al. | |
| 2021/0081203 A1 | 3/2021 | Vald et al. | |
| 2021/0083841 A1* | 3/2021 | Tueno | H04L 9/0618 |
| 2021/0160048 A1 | 5/2021 | Blatt et al. | |
| 2021/0328765 A1 | 10/2021 | Lee et al. | |
| 2021/0328766 A1 | 10/2021 | No et al. | |
| 2021/0344479 A1 | 11/2021 | Lee et al. | |
| 2021/0376995 A1* | 12/2021 | Ratha | H04L 9/3265 |
| 2021/0376996 A1 | 12/2021 | Moon et al. | |
| 2022/0021515 A1 | 1/2022 | Jang et al. | |
| 2022/0085972 A1* | 3/2022 | Jackson, II | H04L 9/008 |
| 2022/0094521 A1 | 3/2022 | Moon et al. | |

FOREIGN PATENT DOCUMENTS

| | | |
|---|---|---|
| KR | 102297536 B1 | 9/2021 |
| KR | 102304992 B1 | 9/2021 |
| KR | 10-2430495 B1 | 8/2022 |

OTHER PUBLICATIONS

Sunwoong Kim, et al. "FPGA-based Accelerators of Fully Pipelined Modular Multipliers for Homomorphic Encryption", 2019 International Conference on ReConFigurable Computing and FPGAs (ReConFig).

U.S. Office Action issued on Jul. 18, 2024 in the related U.S. Appl. No. 17/830,985.

* cited by examiner

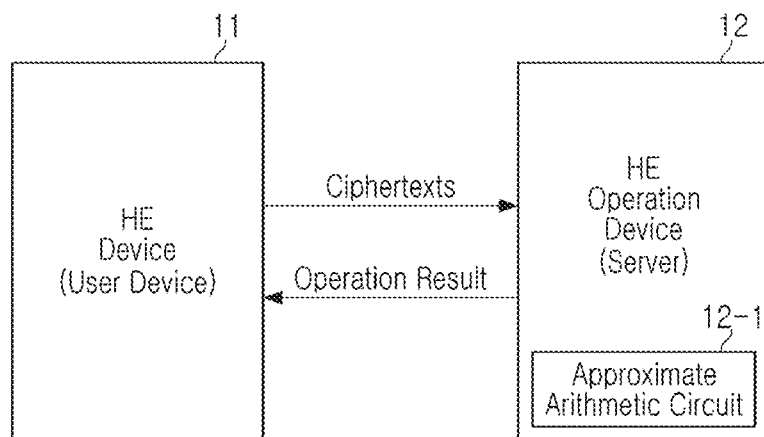
FIG. 1
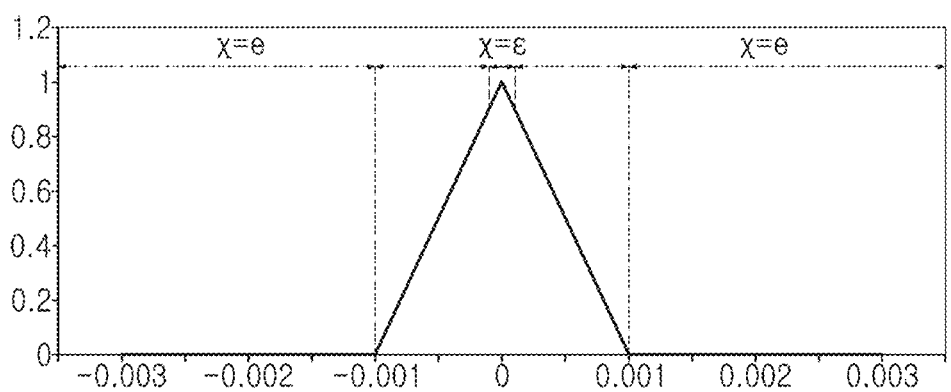
FIG. 2
FIG. 3

HOMOMORPHIC ENCRYPTION SYSTEM FOR SUPPORTING APPROXIMATE ARITHMETIC OPERATION AND METHOD OF OPERATING THE SAME

CROSS TO REFERENCE TO RELATED APPLICATIONS

This application claims benefit of priority to Korean Patent Application No. 10-2021-0154763 filed on Nov. 11, 2021 and Korean Patent Application No. 10-2022-0008489 filed on Jan. 20, 2022 in the Korean Intellectual Property Office, the disclosures of each of which are incorporated herein by reference in their entirety.

BACKGROUND

Some example embodiments relate to a homomorphic encryption system for supporting an approximate arithmetic operation and/or a method of operating the same.

Generally, homomorphic encryption may obtain the same result as an encrypted value after performing an operation on plaintext, even when an operation is performed in a ciphertext state without decrypting encrypted information. Therefore, various operations such as statistical processing and machine learning may be performed using homomorphic encryption without decrypting ciphertext, such that homomorphic encryption may be a core technique to which companies and/or individuals providing big-data based services have been paying attention. Among various homomorphic encryption techniques, a technique closest to commercialization may be a fully homomorphic encryption technique, which may overcome the limitation in the number of operations by applying a bootstrapping technique to leveled homomorphic encryption, which may perform only a limited number of operations. An issue in the commercialization of homomorphic encryption techniques may be a size of ciphertext, which may be increased by orders of magnitude or more, such as tens of times more than that of original data or the plaintext data.

SUMMARY

Some example embodiments provide a homomorphic encryption system enabling a homomorphic encryption operation supporting an approximate arithmetic operation and/or a method of operating the same.

According to various example embodiments, a homomorphic encryption system includes a homomorphic encryption device configured to encrypt plaintext data into a first ciphertext using a homomorphic encryption algorithm; and a homomorphic encryption operation device configured to receive the first ciphertext from the homomorphic encryption device and to perform an approximate arithmetic operation of a transcendental function with respect to the first ciphertext and to a second ciphertext, the approximate arithmetic operation being performed with a homomorphic multiplication operation in a binary tree structure.

According to some example embodiments, a method of operating a cloud server performing a homomorphic encryption operation includes receiving a search request together with a first ciphertext from a user device; performing a homomorphic encryption operation using the first ciphertext and a second ciphertext of the cloud server in response to the search request; and transmitting a result value of performing the homomorphic encryption operation to the user device. The homomorphic encryption operation performs an approximate arithmetic operation of a logical operation with respect to the first ciphertext and the second ciphertext by performing a homomorphic multiplication operation of a binary tree structure.

According to some example embodiments, a method of operating a user device includes encrypting original data using a homomorphic encryption algorithm, when a search for the original data is requested in a cloud server; transmitting a search request together with the encrypted data to the cloud server; receiving a search result value from the cloud server; and decrypting the search result value using the homomorphic encryption algorithm. The search result value is output through a homomorphic multiplication operation of a binary tree structure in the cloud server.

BRIEF DESCRIPTION OF DRAWINGS

The above and other aspects, features, and advantages of the present disclosure will be more clearly understood from the following detailed description, taken in conjunction with the accompanying drawings, in which:

FIG. 1 is a diagram illustrating a homomorphic encryption system according to some example embodiments;

FIG. 2 is a diagram illustrating a relationship between a homomorphic multiplication and an approximate arithmetic operation;

FIG. 3 is a diagram illustrating an approximate equality check function of a homomorphic encryption operation device according to some example embodiments;

DETAILED DESCRIPTION

Figure 4:
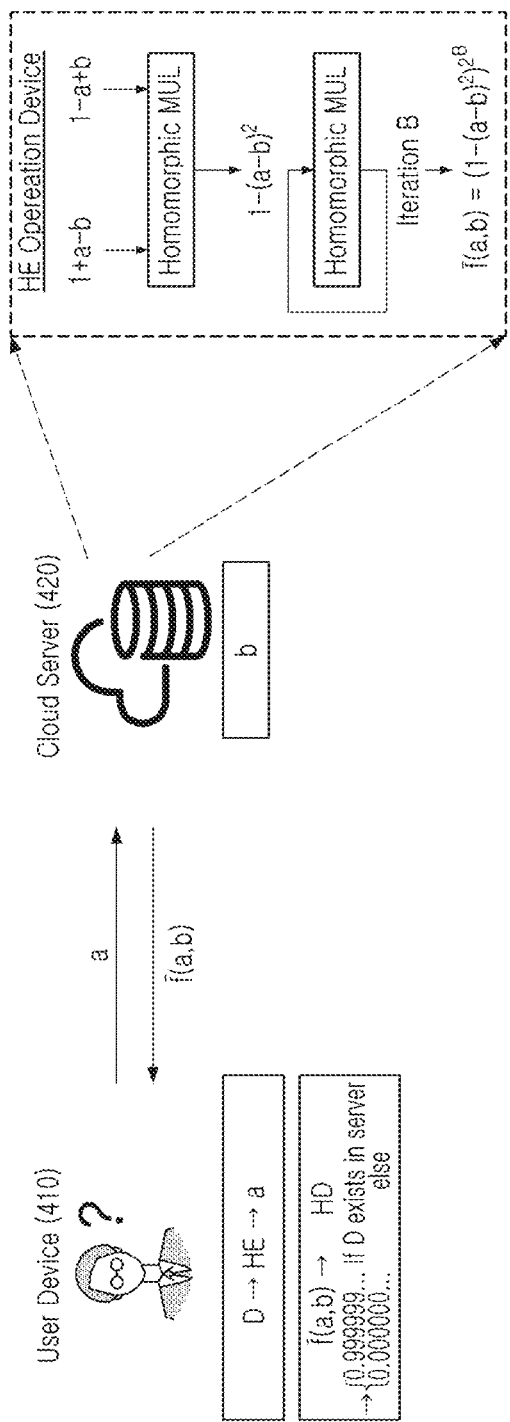
FIG. 4 is a diagram illustrating some example embodiments in which a user searches for specific data in a DB in a server.

Hereinafter, various example embodiments will be described as below with reference to the accompanying drawings.

Homomorphic encryption, which is a fourth-generation encryption technique, may obtain the same result with an encrypted value after an operation on a plaintext even when the operation is performed in a ciphertext state without decrypting the encrypted information. Therefore, homomorphic encryption may allow various operations such as statistical processing and/or machine learning without decrypting ciphertext, and accordingly, homomorphic encryption may be a core technique to which companies and/or individuals providing big0data based services have been paying attention. Among homomorphic encryption techniques, a technique that may be close to commercialization is a fully homomorphic encryption technique which may overcome limitations in the number of operations by applying a bootstrapping technique to leveled homomorphic encryption, which may perform only a limited number of operations.

An example of an operation in the ciphertext state in homomorphic encryption may be an arithmetic operation on or using polynomials. Therefore, transcendental functions, which may not be defined based on roots of a polynomial, such as one or more of various logical functions, a sign function, an indicator function, a trigonometric function, and/or composite functions thereof, that are required or used for statistical processing and machine learning or the like may need to have reduced computational complexity and/or reduced approximation errors. A homomorphic encryption system and/or a method of operating the same in some example embodiments may include an approximation technique of a transcendental function suitable for homomorphic encryption operation through a homomorphic multiplication of a binary tree structure.

FIG. 1 is a diagram illustrating a homomorphic encryption system 10 according to some example embodiments. Referring to FIG. 1, a homomorphic encryption system 10 may include a homomorphic encryption device 11 and a homomorphic encryption operation device 12.

The homomorphic encryption device 11 may be implemented to convert original data or plaintext into ciphertext or ciphertext into plaintext using a homomorphic encryption algorithm. In some example embodiments, the homomorphic encryption device 11 may be or may include a user device. For example, the user device may be implemented as various electronic devices. The electronic device may include one or more of a storage device, a portable communication device (e.g., a smartphone), a computer device, a portable multimedia device, a portable medical device, a camera, a wearable device, or a home appliance device. Alternatively or additionally, the electronic device may be applied to an intelligent service (e.g., one or more of a smart home, a smart city, a smart car, or health care) based on a wireless communication technology and/or an Internet of Things (IoT) related technology.

The homomorphic encryption operation device 12 may be implemented to perform an operation on ciphertexts transmitted from the homomorphic encryption device 11. Data and/or commands may be transferred or transmitted between the homomorphic encryption operation device 12 and the homeomorphic encryption device 11 via a bus, such as a wireless and/or a wired bus. In some example embodiments, the homomorphic encryption operation device 12 may be implemented as a server. For example, the server may provide a cloud service and/or an ultra-low latency service using distributed computing or mobile edge computing. In particular, the server may be or may include an intelligent server using machine learning/neural networks. The homomorphic encryption operation device 12 may include an approximate arithmetic circuit 12-1.

The approximate arithmetic circuit 12 may be implemented to provide an approximate arithmetic operation to perform a search operation in homomorphic encryption. The approximate arithmetic circuit 12 may be implemented to perform a logical operation between ciphertexts in an encrypted state by performing a homomorphic multiplication in a binary tree structure. For example, the approximate arithmetic circuit 12 may be implemented to encode original data into binary data in order to reduce computational complexity, and to perform a low-depth homomorphic operation several times. As a result, the approximate arithmetic circuit 12 may reduce a homomorphic multiplication depth.

A general homomorphic encryption system may perform a polynomial approximation (e.g. one or more of a Taylor polynomial approximation, a Chebyshev polynomial approximation, or the like) for discontinuous portions of a transcendental function, which is a function which may not be defined as or based on a root of a polynomial. A transcendental function may be or may include a function such as a logical function, a sign function, an indicator function, a trigonometric function, a composite function thereof, and/or the like, to implement these functions. However, this polynomial approximation method may cause excessive computational complexity when applied to or during homomorphic encryption. Generally, when optimization approximation techniques of a transcendental function are applied to the homomorphic encryption, computational complexity may excessively increase, such that it may be impossible or challenging to implement the technique. A method of implementing approximation of a transcendental function specialized for homomorphic encryption may be desirable or necessary.

The homomorphic encryption system 10 may, by performing a homomorphic multiplication in a binary tree structure, maintain a security level and may reduce complexity of an operation used in homomorphic encryption.

FIG. 2 is a diagram illustrating a relationship between a homomorphic multiplication and approximate arithmetic operations in general. Referring to FIG. 2, an output significant figure of an approximate polynomial of a specific transcendental function may only be affected by accuracy of the approximate polynomial.

In ring learning with errors (RLWE)-based homomorphic encryption, which may obtain security by inserting randomness or an error into ciphertext data during encryption, the inserted error may increase whenever a homomorphic operation is performed, which may have a direction opposite to increasing an order of an approximate polynomial to increase accuracy of the approximate polynomial. For example, when an approximate polynomial is generated using a homomorphic multiplication with depth L=22, illustrated in FIG. 2, accuracy which the approximate function may output may be 7 bits. However, due to the depth 22 operation, accuracy of the input data may be reduced to 5 bits, such that, when using an approximate polynomial with high accuracy, a level of error inherent in homomorphic encryption may need to or be desired to be considered.

Therefore, it may be necessary or desirable to implement an application function specialized for each homomorphic encryption scheme, rather than using an optimized approximate solution of a general nonlinear or logical function. For example, one of the differences between an operation in homomorphic encryption and a general operation may be a multiplication depth, which may be a number indicating how many multiplication operations are performed on a single piece of data. In homomorphic encryption, the multiplication depth may determine or be a factor in the computational complexity of an entire homomorphic encryption system and valid bits which may be preserved. Therefore, it may be important to reduce complexity of such a homomorphic encryption multiplication in commercializing homomorphic encryption.

The homomorphic encryption operation device in some example embodiments may reduce an approximation error of an approximate polynomial to a reasonable level by maximally using a multiplication of binary tree structure and may reduce a required or used multiplication depth. Alternatively or additionally, the homomorphic encryption operation device in some example embodiments may allow a logical function to bypass to reduce the homomorphic multiplication depth.

The homomorphic encryption operation device may implement a logical function of homomorphic encryption using a binary tree structure. Here, letting original data or plaintext data: $d_1$, $d_2$, generation of encrypted data: $d_1 \rightarrow$homomorphic encryption$\rightarrow$a, $d_2 \rightarrow$homomorphic encryption$\rightarrow$b, and an equality check function go operating on the original data area be defined as below:

$$g(d_1, d_2) = \begin{cases} 1 & \text{if } d_1 = d_2 \\ 0 & \text{else} \end{cases} \quad \text{[Equation 1]}$$

Therefore, an equality check function ENC(·) operating in a homomorphic ciphertext area to be implemented is as follows:

$$f(a, b) = \begin{cases} ENC(1) & \text{if } d_1 = d_2 \\ ENC(0) & \text{else} \end{cases} \quad \text{[Equation 2]}$$

In approximating a transcendental function with a polynomial, approximation accuracy may increase as higher-order polynomials having a higher order are combined. There may be algorithms which may efficiently construct such polynomials. However, in homomorphic encryption, various techniques to reduce the amount of computation may not be applied. There may be a mathematical constraint in that only a polynomial addition and/or polynomial multiplication may be used. One of efficient ways to increase a polynomial order in a homomorphic encryption operation may be to perform a multiplication in a binary tree method. Constructing an approximate polynomial by allocating all the provided resources (an available multiplication depth) to a binary tree multiplication may be a method of polynomial approximation of a transcendental function, which may obtain high accuracy while retaining the amount of operation in homomorphic encryption.

The homomorphic encryption operation device in some example embodiments may implement a high order only by a binary tree multiplication such as an approximate equality check function, $\tilde{f}$.

$$\tilde{f}(a, b) = \left(1 - (a - b)^2\right)^{2^B} = \quad \text{[Equation 2]}$$
$$\begin{cases} ENC(0.999999 \ldots) & \text{if } d_1 = d_2 \\ ENC(0.000000 \ldots) & \text{else} \end{cases} \quad \text{where, } -1 \leq d_1, d_2 \leq 1$$

The number of pieces of data which may be checked for equality may be determined by the degree of quantization of input of the approximate equality check function $\tilde{f}$.

FIG. 3 is a diagram illustrating an approximate equality check function of a homomorphic encryption computation device according to some example embodiments.

Referring to FIG. 3, for example, when an error due to approximation has a difference of epsilon or c (a first reference value) or less, the two values may be the same, and when an error has a difference of theta or θ (a second reference value) or more, the two values may be determined to be different. Sharpness of ε and θ may be determined by the $2^B$ term $\tilde{f}$.

FIG. 4 is a diagram illustrating some example embodiments in which a user searches for specific data in a DB in a server. The user may use a device to homomorphically encrypt original data D of the user and may use the device to generate a first ciphertext a and send first ciphertext a to a server. The server may perform an operation using a homomorphic encryption operation device to which a technique of suggesting a second ciphertext (b) owned by the server and the ciphertext a received from the user, and may return a result thereof to the user. The user device may decrypt the operation result sent by the server and may check the result.

Alternatively or additionally, the homomorphic encryption operation device in some example embodiments may implement a logical function of the homomorphic encryption which may reduce a homomorphic multiplication depth.

Encrypted data may be generated for the original data $d_1$ and $d_2$. For example, $d_1$ may be encoded into binary data, the encoded value $[x_0, x_1, \ldots, x_N]$ may be homomorphically encrypted, and $[a_0, a_1, \ldots, a_N]$ may be output. Additionally, $d_2$ may be encoded into binary data, the encoded value $[y_0, y_1, \ldots, y_N]$ may be homomorphically encrypted, and $[b_0, b_1, \ldots, b_N]$ may be output, where $x_i, y_i \in \{0, 1\}$.

An equality check function operating in the plaintext or original data area may be as below:

$$g(d_1, d_2) = \begin{cases} 1 & \text{if } d_1 = d_2 \\ 0 & \text{else} \end{cases} \quad \text{[Equation 4]}$$

An equality check function ENC(·) operating in the homomorphic ciphertext area to be implemented may be as below:

$$f(a, b) = \begin{cases} ENC(1) & \text{if } d_1 = d_2 \\ ENC(0) & \text{else} \end{cases} \quad \text{[Equation 5]}$$

The homomorphic multiplication depth of the approximate equality check function $\tilde{f}$ may be B+1, where B is the number of repetitions of homomorphic encryption multiplication. In homomorphic encryption, computational complexity may increase exponentially in depth, and thus, to reduce the complexity, by encoding the original data into binary data and by applying a homomorphic operation having a low depth several times, the homomorphic multiplication depth may be lowered.

For example, when B=1, accuracy of an actual approximate polynomial may be one (1) bit, and thus, by dividing the data in 1-bit units and encoding the data, a logical operation between homomorphic ciphertexts may be performed even when an approximate function with low accuracy is used.

| Original Data | Encode | Encryption |
|---|---|---|
| $d_1$ | 0000 | $[a_0, a_1, a_2, a_3]$ = [ENC(0), ENC(0), ENC(0), ENC(0)] |
| $d_2$ | 0001 | $[b_0, b_1, b_2, b_3]$ = [ENC(0), ENC(0), ENC(0), ENC(1)] |

The approximate equality check function f may satisfy an equation as below:

$$\tilde{f}(a, b) = \qquad \text{[Equation 6]}$$
$$\left(1 - (a_0 - b_0)^2\right)\left(1 - (a_1 - b_1)^2\right)\left(1 - (a_2 - b_2)^2\right)\left(1 - (a_3 - b_3)^2\right) =$$
$$\begin{cases} ENC(1) & a_i = b_i \\ ENC(0) & \text{otherwise} \end{cases}.$$

Figure 5:
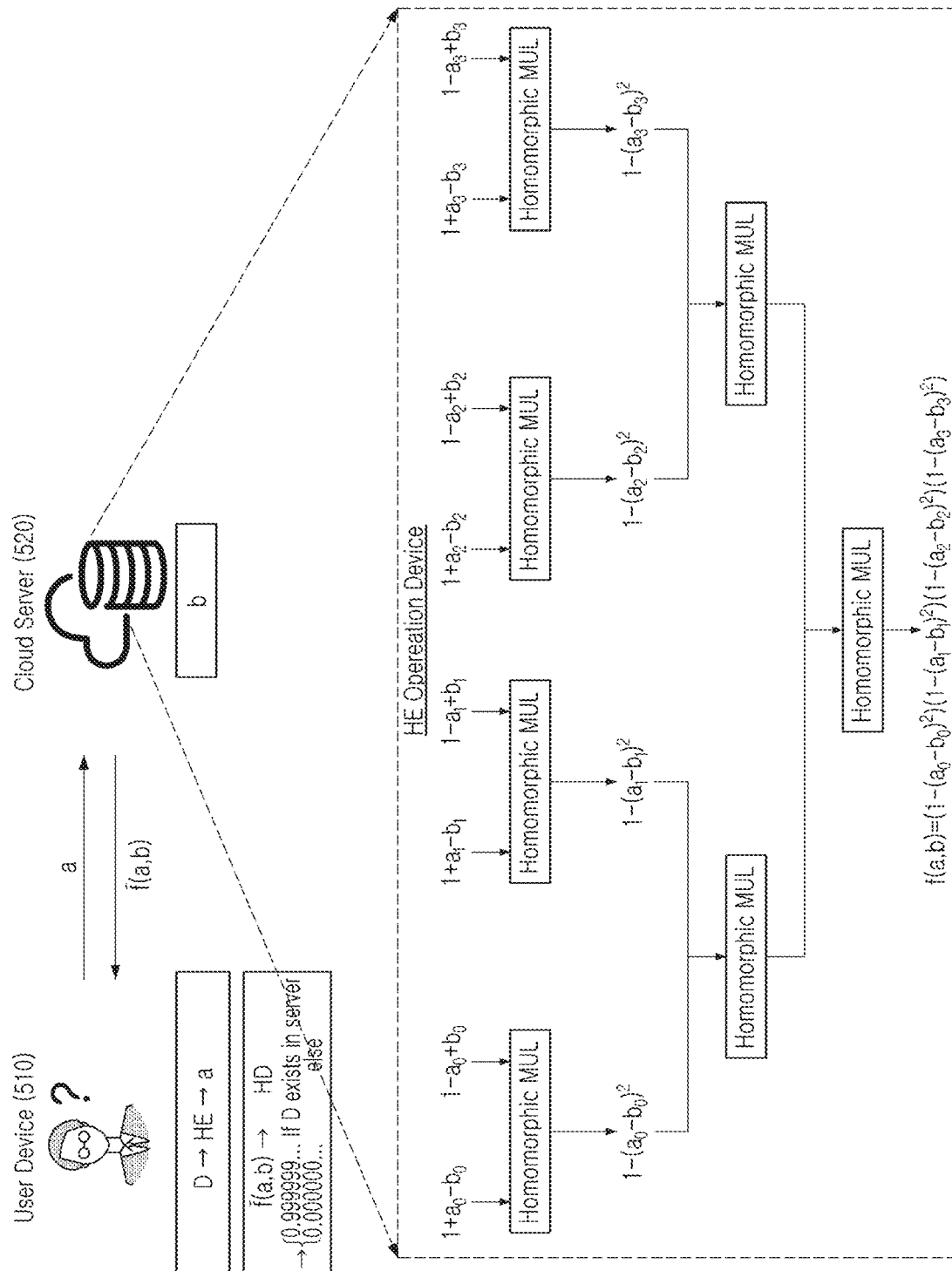
FIG. 5 is a diagram illustrating another example embodiment in which a user searches for specific data in a DB in a server.

FIG. 5 is a diagram illustrating another example embodiment in which a user uses a user device to search for specific data in a DB in a server. The user device may homomorphically encrypt the original data (D) owned by the user and may generate the first ciphertext a, and may transmit the first ciphertext a to the server. The server may perform an operation using a homomorphic encryption operation device to which a technique of suggesting a second ciphertext (b) owned by the server and the ciphertext a received from the user, and may return a result thereof to the user device. The user device may decrypt the operation result sent by the server and may check the result.

Figure 6:
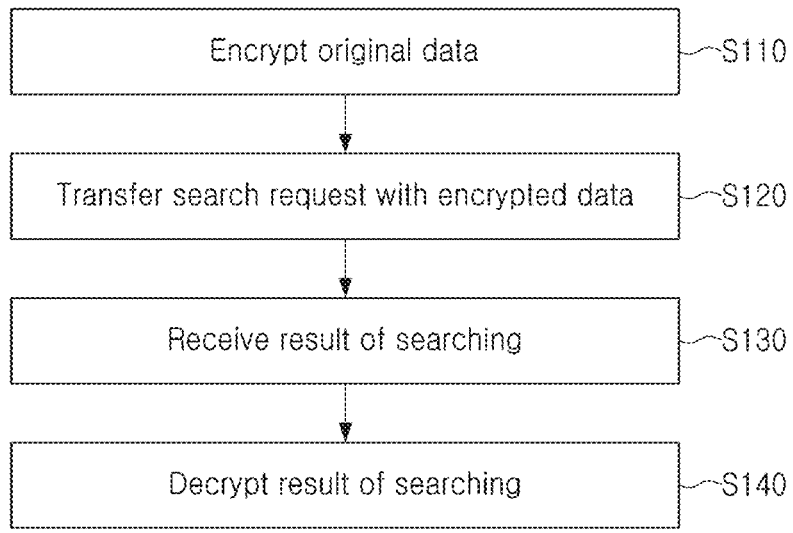
FIG. 6 is a flowchart illustrating a method of operating a homomorphic encryption device according to some example embodiments.

FIG. 6 is a flowchart illustrating a method of operating a homomorphic encryption device according to some example embodiments. Referring to FIG. 6, the homomorphic encryption device may operate as below. When it is necessary or desirable to search for specific data in a server, the homomorphic encryption device may encrypt the specific data based on the homomorphic encryption algorithm (S110). Concurrently or thereafter, the homomorphic encryption device may request a search while transmitting the encrypted data to the server (S120). Concurrently, before, or thereafter, the homomorphic encryption device may receive a search result value from the server with respect to the search result (S130). Concurrently, before, or thereafter, the homomorphic encryption device may decrypt the search result based on the homomorphic encryption algorithm (S140). It may be determined whether there is data corresponding to the server according to the decrypted result value.

Figure 7:
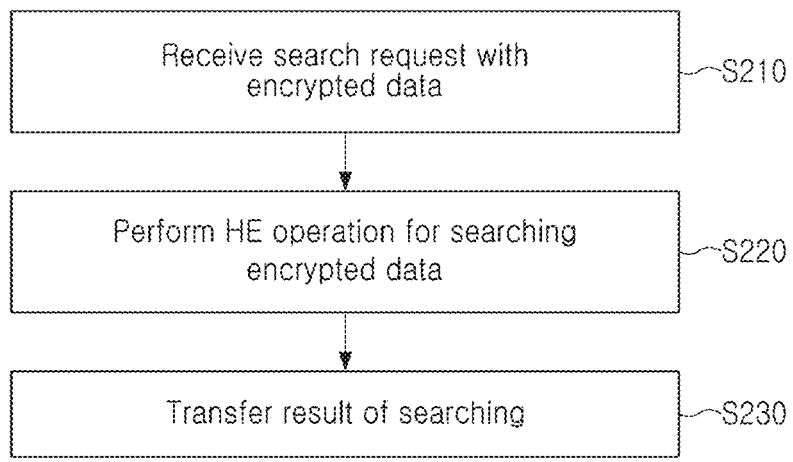
FIG. 7 is a flowchart illustrating a method of operating a homomorphic encryption operation device according to some example embodiments.

FIG. 7 is a flowchart illustrating a method of operating a homomorphic encryption device according to some example embodiments. Referring to FIG. 7, operations of the homomorphic encryption operation device may be performed as below. The homomorphic encryption operation device may receive a search request together with encrypted data (S210). The homomorphic encryption operation device may search for presence of data by performing a homomorphic multiplication based on the approximate arithmetic circuit in response to the search request (S220). Thereafter, the homomorphic encryption operation device may transmit an operation result value corresponding to the search result (S230).

Figure 8:
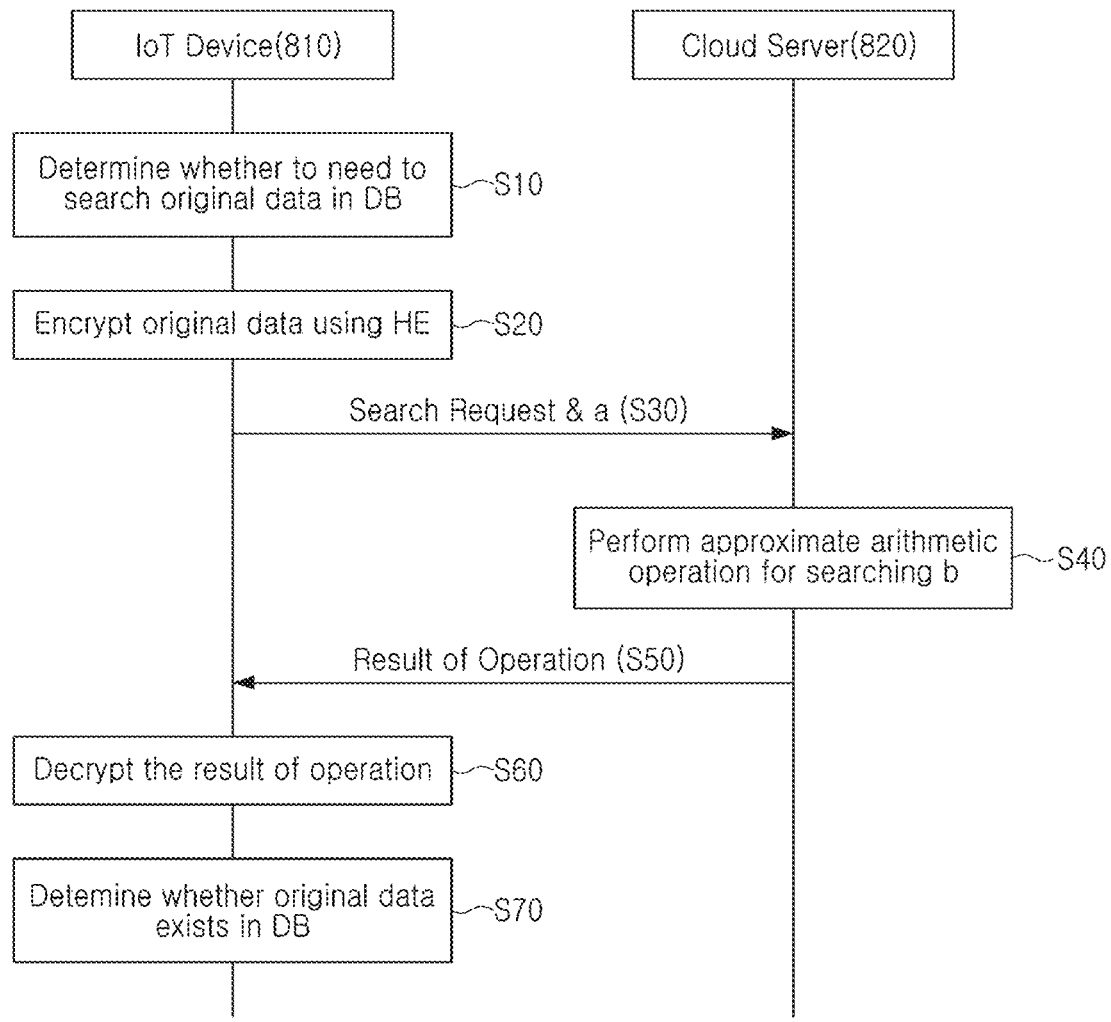
FIG. 8 is a ladder diagram illustrating a method of operating a cloud system according to some example embodiments.

FIG. 8 is a ladder diagram illustrating a method of operating a cloud system according to some example embodiments. Referring to FIG. 8, operations of the cloud system may be performed as below. An IoT device 810 may determine whether it is necessary and/or expected to search whether original data is present in a database of a cloud server 820 (S10). In a case in which a search is required or expected, the IoT device 810 may encrypt the original data based on a homomorphic encryption algorithm (S20). The IoT device 810 may transmit a search request together with the encrypted data (a) to the cloud system 820 (S30).

The cloud server 820 may perform a dynamically determined or predetermined approximate arithmetic operation on the received encrypted data to search for the original data, for example, the first ciphertext a, and the encrypted data stored in the server, for example, the second ciphertext (b), in response to the search request (S40). The cloud server 820 may transmit the result of the approximate arithmetic operation to the IoT device 810 (S50). The IoT device 810 may receive the result of the approximate arithmetic operation and may decrypt the result based on the homomorphic encryption algorithm (S60). The IoT device 810 may determine whether the original data is present in the database of the cloud server 820 using the decrypted value (S70).

The approximate arithmetic operation method in some example embodiments may be applicable to a system for management of COVID-19 vaccine.

Figure 9:
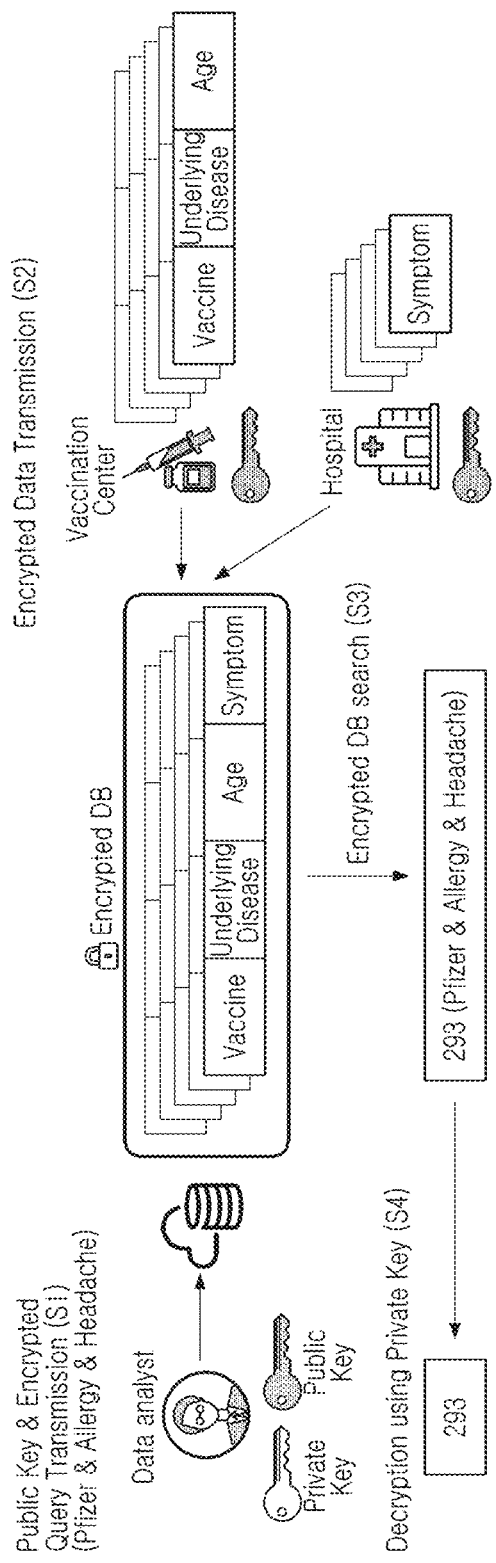
FIG. 9 is a diagram illustrating a COVID-19 vaccine management system according to some example embodiments.

FIG. 9 is a diagram illustrating a COVID-19 vaccine management system according to some example embodiments. Referring to FIG. 9, database or DB analysis may be performed based on encrypted data of two organizations having different personal information. The search technique in some example embodiments may provide an efficient search operation function.

A public key and an encrypted query may be transmitted to the server by a data analyst (S1). The encrypted query may be data encrypted by a private key. A vaccine center and/or a hospital may transmit the encrypted data to the server (S2). The encrypted data may include at least one of types of vaccine, medical history, and age for each individual. The server may include an encrypted database. The encrypted database may include a table including types of vaccine, medical history, age, and symptoms for each individual. The server may perform an encrypted database search using the approximate arithmetic operation method described with reference to FIGS. 1 to 8 (S3). Search results may be transmitted to a data analyst. The data analyst may decrypt the search result value using the private key corresponding to a human cell 293.

The user device in some example embodiments may be implemented a smart storage device; however, example embodiments are not limited thereto.

Figure 10:
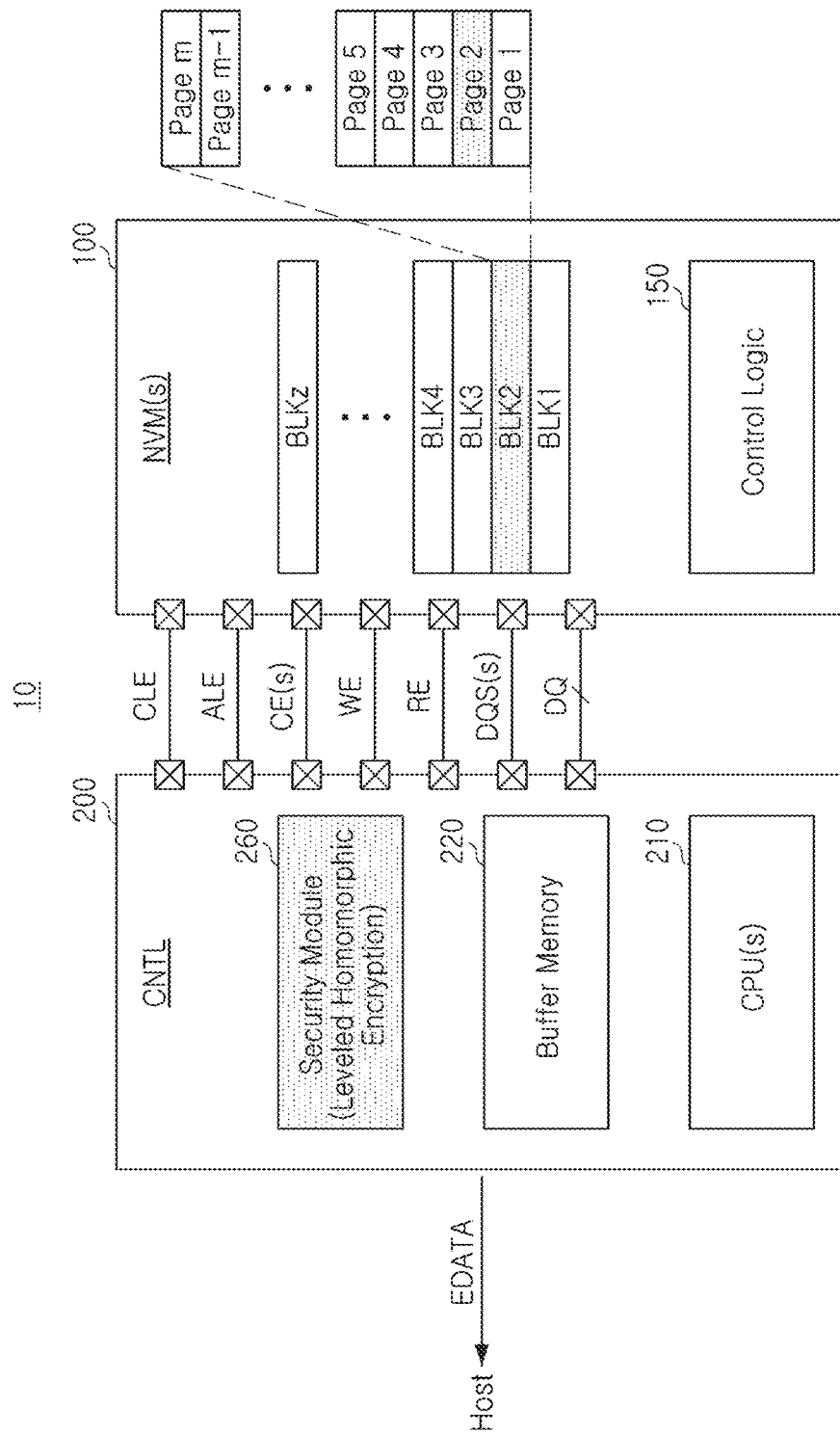
FIG. 10 is a diagram illustrating a storage device according to some example embodiments.

FIG. 10 is a diagram illustrating a storage device according to some example embodiments. Referring to FIG. 10, the storage device 10 may include at least one nonvolatile memory device NVM(s) 100 and a controller CNTL 200.

At least one nonvolatile memory device 100 may be implemented to store data. The nonvolatile memory device 100 may include one or more of a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. Alternatively or additionally, the nonvolatile memory device 100 may be implemented in a three-dimensional array structure. Example embodiments may be applicable to a flash memory device in which the charge storage layer is configured as a conductive floating gate, and also to a charge trap flash (CTF) in which a charge storage layer is configured as an insulating film. Hereinafter, the nonvolatile memory device 100 will be referred to as a vertical NAND flash memory device (VNAND) for ease of description.

Alternatively or additionally, the nonvolatile memory device 100 may be implemented to include a plurality of memory blocks BLK1 to BLKz (z is an integer equal to or greater than 2) and a control logic 150. Each of the plurality of memory blocks BLK1 to BLKz may include a plurality of pages Page 1 to Page m (m is an integer equal to or greater than 2). Each of the plurality of pages Page 1 to Page m may include a plurality of memory cells. Each of the plurality of memory cells may store at least one bit.

The control logic 150 may receive a command and an address from the controller 200 (CNTL), and may perform an operation (a program operation, a read operation, erase operation, or the like,) corresponding to the received command on memory cells corresponding to the address.

The controller 200 (CNTL) may be connected to at least one nonvolatile memory device 100 through a plurality of control pins for transmitting control signals (e.g., CLE, ALE, CE(s), WE, RE, or the like). Also, the controller 200 may be implemented to control the nonvolatile memory device 100 using control signals such as one or more of CLE, ALE, CE(s), WE, RE, or the like). For example, the nonvolatile memory device 100 may latch a command or an address on an edge of a write enable (WE)/read enable (RE) signal according to a command latch enable (CLE) signal and an address latch enable (ALE) signal, such that program operation/read operation/erase operation may be performed. For example, during a read operation, the chip enable signal CE may be activated, CLE may be activated during a command transmission period, ALE may be activated during an address transmission period, and RE may be toggled during a period in which data is transmitted through a data signal line DQ. The data strobe signal DQS may be toggled with a frequency corresponding to a data input/output speed. Read data may be transmitted in sequence in synchronization with the data strobe signal DQS.

Alternatively or additionally, the controller 200 may include at least one processor 210 (central processing units (CPUs), a buffer memory 220, and a security module 260.

The processor 210 may be implemented to control overall operation of the storage device 10. The processor 210 may perform various management operations such as one or more of cache/buffer management, firmware management, garbage collection management, wear leveling management, data deduplication management, read refresh/reclaim management, bad block management, multi-stream management, mapping of host data and nonvolatile memory, quality of service (QoS) management, system resource allocation management, nonvolatile memory queue management, read level management, erase/program management, hot/cold data management, power loss protection management, dynamic thermal management, initialization management, redundant array of inexpensive disk (RAID) management, and the like.

The buffer memory 220 may be implemented as a volatile memory (e.g., one or more of static random access memory (SRAM), dynamic RAM (DRAM), synchronous RAM (SDRAM), or the like, and/or a nonvolatile memory (e.g., one or more of flash memory, phase-change RAM (PRAM), magneto-resistive RAM (MRAM), resistive RAM (Re-RAM), ferroelectric RAM (FRAM), or the like).

The security module 260 may be implemented to perform a security function of the storage device 10. For example, the security module 260 may perform a self-encryption disk (SED) function or a trusted computing group (TCG) security function. The SED function may store encrypted data in the nonvolatile memory device 100 using an encryption algorithm or may decrypt data encrypted from the nonvolatile memory device 100. The encryption/decryption operation may be performed using an internally generated encryption key. In some example embodiments, the encryption algorithm may be an advanced encryption standard (AES) encryption algorithm. However, the encryption algorithm is not limited thereto. The TCG security function may provide a mechanism enabling access control to user data on the storage device 10. For example, the TCG security function may perform an authentication procedure between an external device and the storage device 10. In some example embodiments, the SED function or the TCG security function may be optionally selected.

Alternatively or additionally, the security module 260 may generate a ciphertext (EDATA) based on a leveled homomorphic encryption algorithm. The security module 260 may receive the operation result received from the host device and may decrypt the result based on the leveled homomorphic encryption algorithm.

The example embodiment may be applicable to an electronic device having a storage device.

Figure 11:
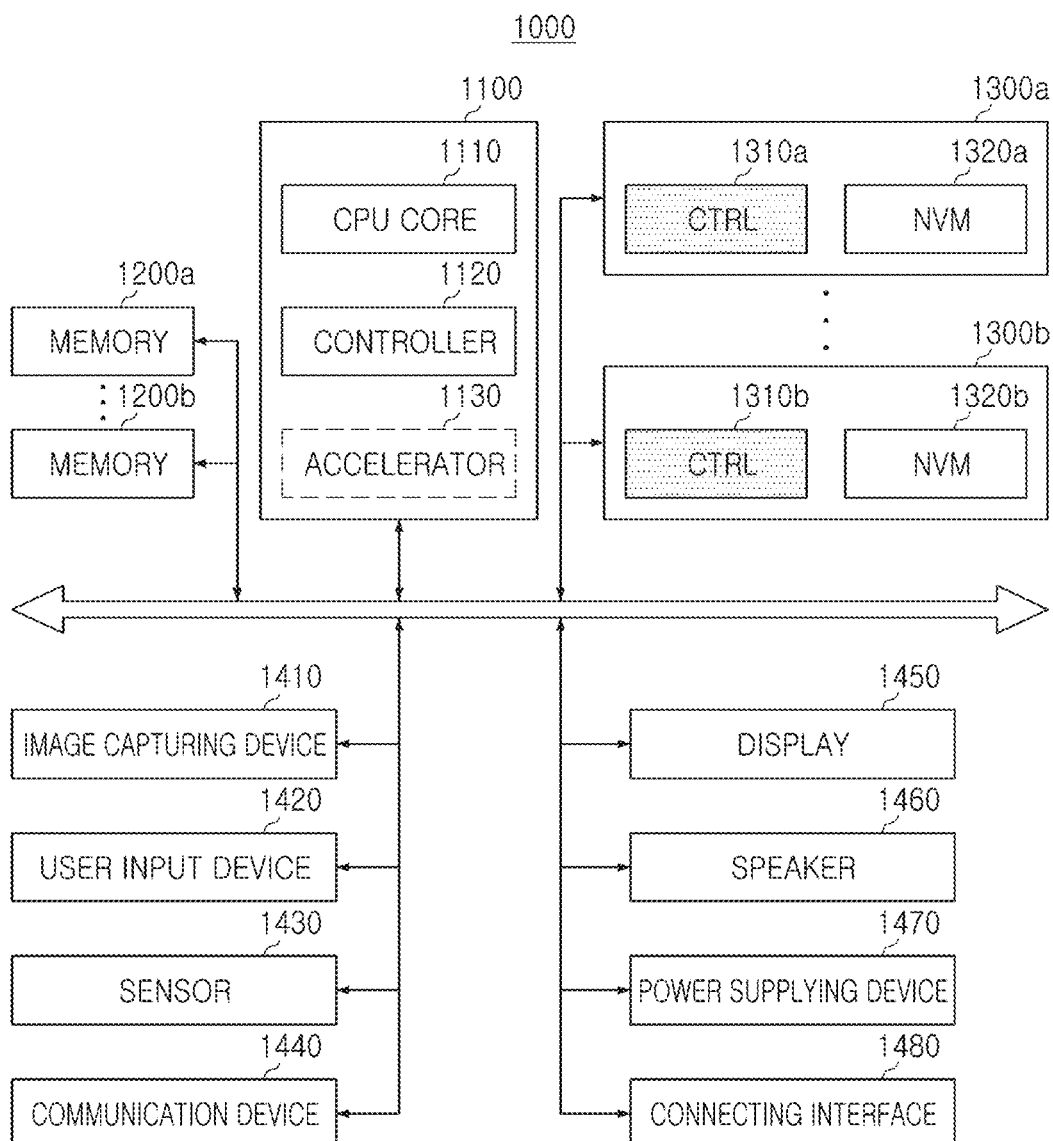
FIG. 11 is a diagram illustrating an electronic device to which a storage device is applied according to some example embodiments.

FIG. 11 is a diagram illustrating an electronic device to which a storage device is applied according to some example embodiments. The electronic device 1000 illustrated in FIG. 11 may be implemented as a mobile system such as one or more of a mobile phone, a smart phone, a tablet personal computer (PC), a wearable device, a health care device, or an Internet of Things (IoT) device. However, the electronic device 1000 in FIG. 1 is not necessarily limited to a mobile system, and may be implemented as one or more of a personal computer, a laptop computer, a server, a media player, or an automotive device such as a navigation device.

Referring to FIG. 11, the electronic device 1000 may include a main processor 1100, memories 1200a and 1200b, and storage devices 1300a and 1300b. Also, the electronic device 1000 may further include one or more of an image capturing device 1410, a user input device 1420, a sensor 1430, a communication device 1440, a display 1450, and a speaker. 1460, a power supplying device 1470, and a connecting interface 1480.

The main processor 1100 may control overall operation of the electronic device 1000, more specifically, operations of other components included in the electronic device 1000. The main processor 1100 may be implemented as a general processor, a dedicated processor, or an application processor.

The main processor 1100 may include one or more CPU cores 1110. Also, the main processor 1100 may further include a controller 1120 for controlling the memories 1200a and 1200b or the storage devices 1300a and 1300b. In some example embodiments, the main processor 1100 may further include an accelerator 1130 which may be a dedicated circuit for high-speed data operation such as artificial intelligence (AI) data operation. The accelerator 1130 may include a graphics processing unit (GPU), a neural processing unit (NPU), or a data processing unit (DPU). The accelerator 1130 may be implemented as a chip physically independent from the other components of the main processor 1100.

The memories 1200a and 1200b may be used as main memory devices of the electronic device 1000. The memories 1200a and 1200b may include volatile memories such as SRAM or DRAM, or may include nonvolatile memories such as a flash memory, PRAM or RRAM. The memories 1200a and 1200b may be implemented in the same package as the main processor 1100.

The storage devices 1300a and 1300b may be implemented as nonvolatile storage devices storing data regardless of whether power is supplied or not; however, example embodiments are not necessarily limited thereto. The storage devices 1300a and 1300b may have a relatively large storage capacity as compared to that of the memories 1200a and 1200b. The storage devices 1300a and 1300b may include memory controllers 1310a and 1310b and nonvolatile memory (NVM) 1320a and 1320b for storing data under control of the memory controllers 1310a and 1310b. The nonvolatile memories 1320a and 1320b may include a flash memory having a two-dimensional (2D) structure or a three-dimensional (3D) vertical NAND (V-NAND) structure, or may include other types of nonvolatile memory such as PRAM or RRAM.

Alternatively or additionally, the storage devices 1300a and 1300b may be implemented to perform an encryption/decryption operation using a homomorphic encryption algorithm as described with reference to FIGS. 1 to 10.

The storage devices 1300a and 1300b may be included in the electronic device 1000 in a state of being physically separated from the main processor 1100. Alternatively or additionally, the storage devices 1300a and 1300b may be implemented in the same package as the main processor 1100. Alternatively or additionally, the storage devices 1300a and 1300b may have the same shape as a solid state device (SSD) or a memory card, such that the storage devices may be detachable to the other components of the electronic device 1000 through an interface such as the connecting interface 1480. The storage devices 1300a and 1300b may be applied with standard protocols such as universal flash storage (UFS), embedded multi-media card (eMMC), or nonvolatile memory express (NVMe), but some example embodiments thereof is not limited thereto.

The image capturing device 1410 may obtain a still image or a video. The image capturing device 1410 may be implemented as one or more of a camera, a camcorder, or a webcam.

The user input device 1420 may receive various types of data input from a user of the electronic device 1000, and may be implemented as one or more of a touch pad, a keypad, a keyboard, a mouse, or a microphone.

The sensor 1430 may detect various types of physical quantities which may be obtained from an external entity of the electronic device 1000, and may convert the sensed physical quantities into electrical signals. The sensor 1430 may be implemented as one or more of a temperature sensor, a pressure sensor, an illuminance sensor, a position sensor, an acceleration sensor, a biosensor, or a gyroscope sensor.

The communication device 1440 may transmit wired/wireless signals and receive to and receive wired/wireless signals from external devices of the electronic device 1000 according to various communication protocols. The communication device 1440 may include an antenna, a transceiver, or a modem (MODEM).

The display 1450 and the speaker 1460 may function as output devices configured to output visual information and auditory information to the user of the electronic device 1000.

The power supply device 1470 may appropriately convert power supplied from a battery embedded in the electronic device 1000 or an external power source and may supply power to each component of the electronic device 1000.

The connecting interface 1480 may provide connection between the electronic device 1000 and an external device connected to the electronic device 1000 to exchange data with the system 1000. The connecting interface 1480 may be implemented by various interface methods such as one or more of advanced technology attachment (ATA), serial ATA (SATA), external SATA (e-SATA), small computer small interface (SCSI), serial attached SCSI (SAS), peripheral component interconnection (PCI), PCI express (PCIe), NVMe , IEEE 1394, universal serial bus (USB), secure digital (SD) card, multi-media card (MMC), eMMC, UFS, embedded universal flash storage (eUFS), or compact flash (CF) card interface.

In FIG. 11, a series of operations for transmitting the same type of encryption data may be performed by the memory controllers 1310a and 1310b. However, example embodiments thereof are not limited thereto. The electronic device in the example embodiment may include a security module independently performing a series of operations for transmitting homomorphic encrypted data.

The homomorphic encryption operation device in some example embodiments may include a ciphertext logic operation device for performing a logical operation between ciphertexts in an encrypted state by performing a homomorphic multiplication in a binary tree structure. A method of computing ciphertext of the homomorphic encryption operation device in some example embodiments may perform a logical operation between ciphertexts in an encrypted state by performing a homomorphic multiplication in a binary tree structure.

To apply the homomorphic encryption to a general application system, the speed and/or the amount of computation of the entire system may be improved or optimized in consideration of limitations which only the homomorphic encryption has. Generally, complexity of homomorphic encryption-based application technology may require efficient use of homomorphic multiplication. Example embodiments may, by reducing the ciphertext depth which may greatly affect performance of the entire system in homomorphic encryption, provide a higher security level and may lower computational complexity when providing a search operation function.

According to the aforementioned various example embodiments, the homomorphic encryption system and/or method of operating the same may, by performing an approximate arithmetic operation using a homomorphic multiplication of a binary tree structure, reduce complexity and may effectively enable a homomorphic encryption operation.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While various example embodiments have been illustrated and described above, it will be apparent to those of ordinary skill in the art that modifications and variations could be made without departing from the scope as defined by the appended claims. Furthermore example embodiments are not necessarily mutually exclusive with one another. For example, some example embodiments may include one or more features described with reference to one or more figures, and may also include one or more other features described with reference to one or more other figures.

What is claimed is:

1. A homomorphic encryption system, comprising:
   a homomorphic encryption device configured to encrypt original data into a first ciphertext by using a homomorphic encryption algorithm; and a homomorphic encryption operation device configured to receive the first ciphertext from the homomorphic encryption device and to perform an approximate arithmetic operation of a transcendental function with respect to the first ciphertext and to a second ciphertext by performing a homomorphic multiplication operation using a binary tree structure having a root node associated with the homomorphic multiplication operation using the first ciphertext and the second ciphertext.

2. The homomorphic encryption system of claim 1, wherein the homomorphic encryption algorithm includes a ring learning with error (RLWE)-based homomorphic encryption algorithm.

3. The homomorphic encryption system of claim 1, wherein the transcendental function includes one or more of a logical function, a sign function, an indicator function, a trigonometric function, and a composite function thereof.

4. The homomorphic encryption system of claim 1, wherein the homomorphic encryption operation device is configured to perform an approximate arithmetic operation of the transcendental function using an approximate equality check function.

5. The homomorphic encryption system of claim 4, wherein the approximate equality check function is a function that performs the homomorphic multiplication operation on a value obtained by adding a difference value of the second ciphertext from the first ciphertext to one (1) with a value obtained by subtracting the difference value from one (1), and by repeating the homomorphic multiplication operation a plurality of times.

6. The homomorphic encryption system of claim 5, wherein the homomorphic encryption device is configured to receive a result value of the approximate equality check function from the homomorphic encryption operation device, and to decrypt the result value using the homomorphic encryption algorithm.

7. The homomorphic encryption system of claim 6, wherein the homomorphic encryption device is configured to determine that a first plaintext corresponding to the first ciphertext is equal to a second plaintext corresponding to the second ciphertext in response to the decrypted result value being less than or equal to a first reference value, and the homomorphic encryption device is configured to determine that the first plaintext is different from the second plaintext in response to the decrypted result value being greater than or equal to a second reference value, and
the second reference value is greater than the first reference value.

8. The homomorphic encryption system of claim 1, wherein the first ciphertext corresponds to first values obtained by encoding a corresponding first plaintext into first binary data and encrypting the encoded first binary data using the homomorphic encryption algorithm, and
the second ciphertext corresponds to second values obtained by encoding a corresponding second plaintext into second binary data and encrypting the encoded second binary data using the homomorphic encryption algorithm.

9. The homomorphic encryption system of claim 8, wherein the homomorphic encryption operation device is configured to perform the homomorphic multiplication operation of the binary tree structure with respect to the first value and the second values.

10. The homomorphic encryption system of claim 9, wherein the homomorphic encryption device is configured to receive a result value of the homomorphic multiplication operation from the homomorphic encryption operation device, to decrypt the received result value using the homomorphic encryption algorithm, and to determine whether the second plaintext is the same as the first plaintext using the decrypted result value.

11. An operating method of a cloud server configured to perform a homomorphic encryption operation, the method comprising:
receiving, from a user device, a search request together with a first ciphertext;
performing the homomorphic encryption operation using the first ciphertext and a second ciphertext of the cloud server in response to the search request; and
transmitting a result value of performing the homomorphic encryption operation to the user device,
wherein the homomorphic encryption operation performs an approximate arithmetic operation of a logical operation with respect to the first ciphertext and to the second ciphertext by performing a homomorphic multiplication operation of a binary tree structure,
wherein each of the first ciphertext and the second ciphertext includes a plurality of ciphertext elements,
the plurality of ciphertext elements included in the first ciphertext are ciphertext elements obtained by converting plaintexts into binary data, and
the plurality of ciphertext elements included in the second ciphertext correspond to bits of the converted binary data.

12. The method of claim 11, wherein the homomorphic encryption operation uses an approximate equality check function.

13. The method of claim 12, wherein the approximate equality check function includes a function that performs a homomorphic multiplication operation with respect to a first operation value of the first ciphertext and the second ciphertext and with respect to a second operation value of the first ciphertext and the second ciphertext.

14. The method of claim 11, wherein the performing the homomorphic encryption operation includes performing the homomorphic encryption operation of the binary tree structure with respect to the first ciphertext elements of the first ciphertext and to the second ciphertext elements of the second ciphertext.

15. The method of claim 11, wherein the binary tree structure has a root node associated with the homomorphic multiplication operation using the first ciphertext and the second ciphertext.

16. An operating method of a user device, the method comprising:
encrypting plaintext data using a homomorphic encryption algorithm when a search for the plaintext data in a cloud server is requested;
transmitting a search request together with the encrypted data to the cloud server;
receiving a search result value from the cloud server; and
decrypting the search result value using the homomorphic encryption algorithm,
wherein the search result value is output through a homomorphic multiplication operation of a binary tree structure in the cloud server having a root node associated with the homomorphic multiplication operation using the first ciphertext and a second ciphertext.

17. The method of claim 16, wherein the encrypting includes:
- converting the plaintext data into binary data; and
- encrypting each bit of the binary data using the homomorphic encryption algorithm.

18. The method of claim 16, further comprising:
- decrypting the search result value using the homomorphic encryption algorithm.

19. The method of claim 18, further comprising:
- determining whether the plaintext data is present in the cloud server using the decrypted result value.

20. The method of claim 16, wherein the user device includes a smart solid state drive (SSD).

\* \* \* \* \*